United States Patent
Lane et al.

(10) Patent No.: US 9,271,449 B2
(45) Date of Patent: Mar. 1, 2016

(54) DECORATIVE CURBING APPARATUS FOR DEPLOYING DEVICES IN A LANDSCAPING SETTING

(71) Applicants: Troy R Lane, Phoenix, AZ (US); Ronald T Thomsen, Kalispell, MT (US)

(72) Inventors: Troy R Lane, Phoenix, AZ (US); Ronald T Thomsen, Kalispell, MT (US)

(*) Notice: Subject to any disclaimer, the term of this patent is extended or adjusted under 35 U.S.C. 154(b) by 0 days.

(21) Appl. No.: 14/214,865

(22) Filed: Mar. 15, 2014

(65) Prior Publication Data

US 2014/0259982 A1    Sep. 18, 2014

Related U.S. Application Data

(60) Provisional application No. 61/852,414, filed on Mar. 15, 2013.

(51) Int. Cl.
*E04B 2/08* (2006.01)
*A01G 1/08* (2006.01)
*E04C 1/39* (2006.01)

(52) U.S. Cl.
CPC ... *A01G 1/08* (2013.01); *E04B 2/08* (2013.01); *E04C 1/395* (2013.01)

(58) Field of Classification Search
CPC .................................. A01G 1/08; E04C 1/395
USPC ................................................. 52/102; 47/33
See application file for complete search history.

(56) References Cited

U.S. PATENT DOCUMENTS

| | | | | |
|---|---|---|---|---|
| 3,520,082 A * | 7/1970 | Smith | | 47/33 |
| 3,676,952 A * | 7/1972 | Watts | | 47/33 |
| 3,762,113 A * | 10/1973 | O'Mullan et al. | | 52/102 |
| 4,074,479 A * | 2/1978 | Krupka | | 52/102 |
| 4,945,675 A | 8/1990 | Kendrick | | |
| 5,442,877 A * | 8/1995 | Lindhal | | 47/33 |
| 5,611,641 A * | 3/1997 | Christensen | | 404/6 |
| 6,925,753 B1 | 8/2005 | Mallory | | |
| 7,322,714 B2 * | 1/2008 | Barnett et al. | | 362/152 |
| 2005/0081437 A1 * | 4/2005 | Heinemann | | 47/33 |

* cited by examiner

*Primary Examiner* — Brian Glessner
*Assistant Examiner* — Paola Agudelo
(74) *Attorney, Agent, or Firm* — Law Office of Craig Bohn; Craig E. Bohn

(57) ABSTRACT

A durable, versatile, reusable landscaping curb system includes a plurality of sectional housings, yieldably connectable by joining clips, a typical housing section having a substantially hollow body, a substantially horizontal face on the top of the housing, the horizontal face supported by two sides, the two sides being first and second substantially vertical faces, the first and second substantially vertical faces disposed in a parallel relationship with respect to each other. The joining clips comprising two clip halves that can be paired to provide connection of two housing sections, or a single clip half may be attached to a specialized housing component, such as a terminating end, a foundation interface, a driveway interface, a patio interface, or an utilities feed interface.

16 Claims, 3 Drawing Sheets

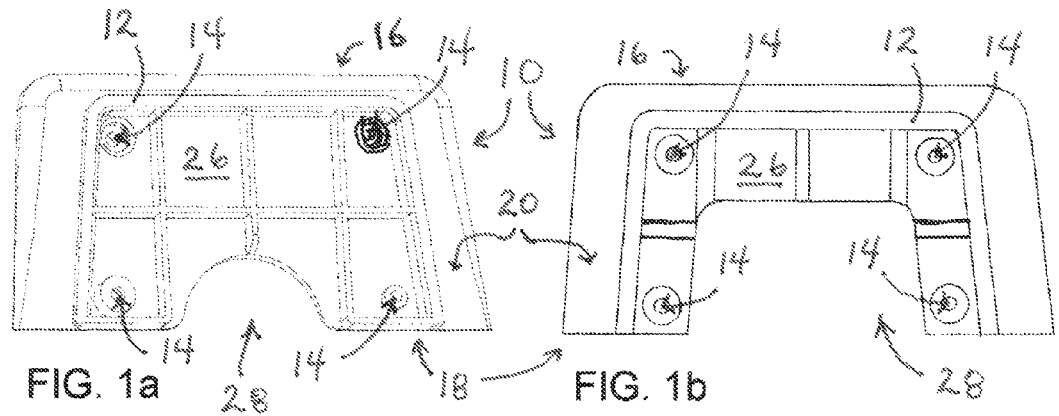
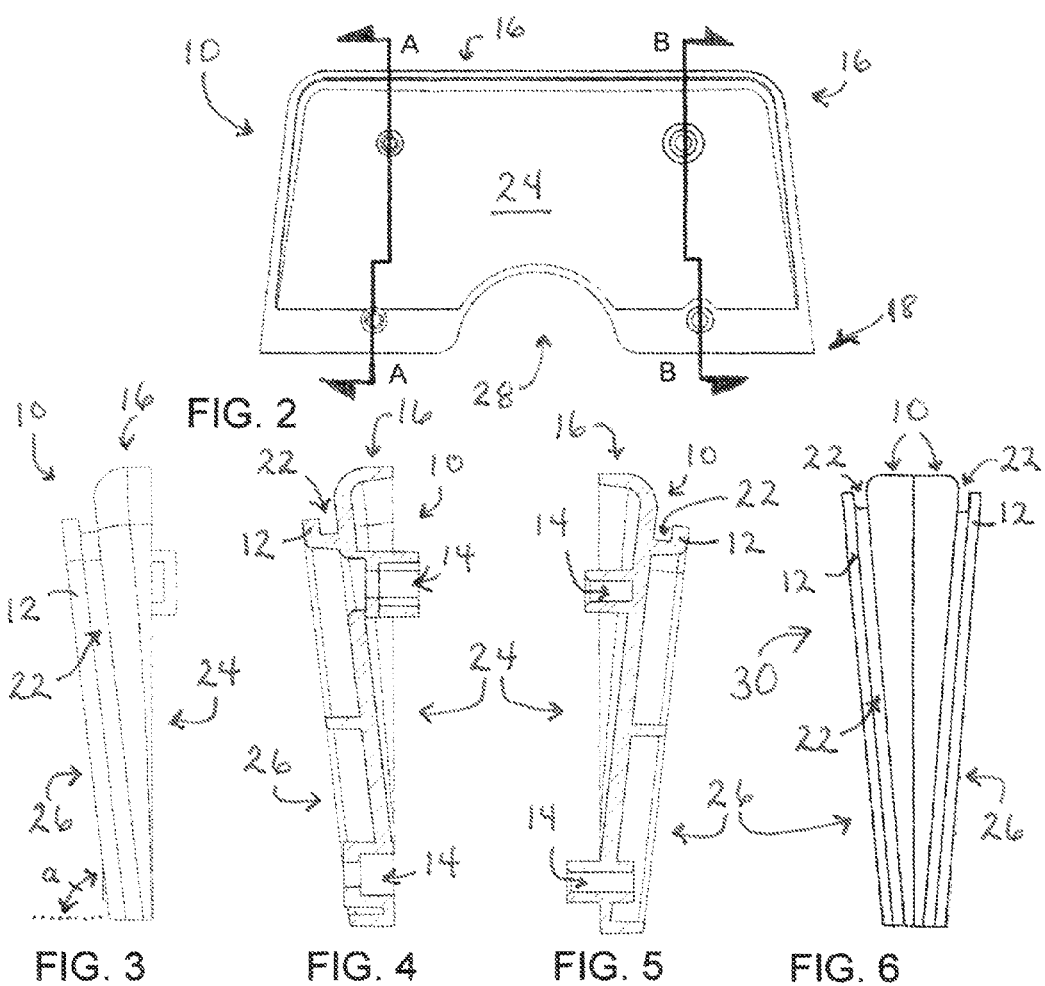

DECORATIVE CURBING APPARATUS FOR DEPLOYING DEVICES IN A LANDSCAPING SETTING

CROSS-REFERENCE TO RELATED APPLICATIONS

This application claims the benefit of U.S. patent application No. 61/852,414, filed 15 Mar. 2013 by the present inventor.

STATEMENT REGARDING FEDERALLY SPONSORED RESEARCH OR DEVELOPMENT

Not Applicable

BACKGROUND OF THE INVENTION

1. Field of the Invention

The present invention relates broadly to landscaping. Specifically, the present invention relates to decorative curbing deployed in a landscape application. More specifically, the present invention relates to lightweight decorative curbing.

2. Description of the Related Art

Extruded concrete curbing has been used in landscaping for decades. Typically, such landscaping techniques involve bringing extrusion equipment to the job site, loading it with concrete mix and water, and moving the extrusion equipment as the concrete curb is extruded. In landscaping, the outward appearance of a curb provides an orderly appearance generally appealing to a large section of the population. The technique of forming curbs in place with concrete is costly, permanent, and in many instances, there is not enough space for the extrusion equipment to extrude curbing in a desired location. This shortcoming is often seen in newer residential construction, where lot sizes are small and homes occupy much of the land. For many of these homes, the side access leading to the backyard is very narrow and prevents the use of curb extrusion equipment. Segmented curbing, where the decorative curbing is cast in pieces and configured as desired, offers a solution to the access problem, but deters most homeowners because segmented curbing is still too heavy for most homeowners, and lacks the desired appearance of extruded curbing. The shortcomings of segmented curbing are easily viewed after a period of time passes from its installation, as the ground under these heavy concrete segments may settle differently under different segments, allowing the curb segments to fall out of alignment and further detract from the desired appearance of extruded curbing.

Whether extruded or segmented, concrete curbing suffers additional shortcomings. Concrete breaks down over prolonged exposure to water, especially in freezing climates. Often, within a couple of years, cracks form or pieces of the concrete chip away from the curbing. It also is beyond the abilities of most homeowners to perform repairs on damaged concrete, and the only solution is tear out the existing curbing, either with sledgehammers and pry bars or power equipment such as jackhammers. The cost of concrete curbing is also prohibitive to the renting public, as such improvements are generally considered fixtures and thus remain after the renter vacates the premises. When the average renter only stays in a property for a short span of time, there is no incentive to select decorative curbing as a landscaping choice.

Another shortcoming of existing decorative curbing lacks utility. Aside from serving as a border between areas of a garden, such as between flowerbeds and lawn, decorative curbing provides little utility in the landscape setting aside from decoration. Because concrete curbing is solid, and, in the case of extruded applications, there is no way to use the span of curbing to deploy wiring or plumbing, or reuse the spans in order to easily alter the landscaping. Thus, there remains a heartfelt need for decorative curbing that solves the shortcomings of traditional curbing, whether extruded or segmented, and it would be an improvement to the art to provide an easy to install, reusable, versatile decorative curbing system.

Finally, existing decorative curbing lack are rigidly linked link. They lack flexibility with respect to adjacent members, or do not permit one member to yield with respect to an adjacent member in the event that one member is under a heavy weight of a vehicle, or even the modest weight of yard equipment. Under extreme or repeated load, if the connection does not permit the members to yield, one of the members or the connection will ultimately break. It would additionally an improvement to the art to provide for a reusable decorative curbing system that securely remains connected, yet provides for yielding and flexibility between the components in order to better resist damage from movements in the ground or being run over by heavy equipment.

BRIEF DESCRIPTION OF THE DRAWINGS

The invention will be explained in conjunction with an illustrative embodiment shown in the accompanying drawings, in which:

FIG. 1a is a perspective illustration of an outside surface of an exemplary clip half according to the present disclosure.

FIG. 1b is an orthogonal view of an outside surface of an exemplary clip half according to the present disclosure.

FIG. 2 is an orthogonal view of an inside surface of an exemplary clip half according to the present disclosure.

FIG. 3 is an orthogonal view of a side surface of an exemplary clip half according to the present disclosure.

FIG. 4 is an orthogonal side view of the clip half of FIG. 2, cut at line segment B-B.

FIG. 5 is an orthogonal side view of the clip half of FIG. 2, cut at line segment A-A.

FIG. 6 is an orthogonal side view of a joined pair of exemplary clip halves according to the present disclosure.

DESCRIPTION OF THE ILLUSTRATED EMBODIMENT

Figure 7:
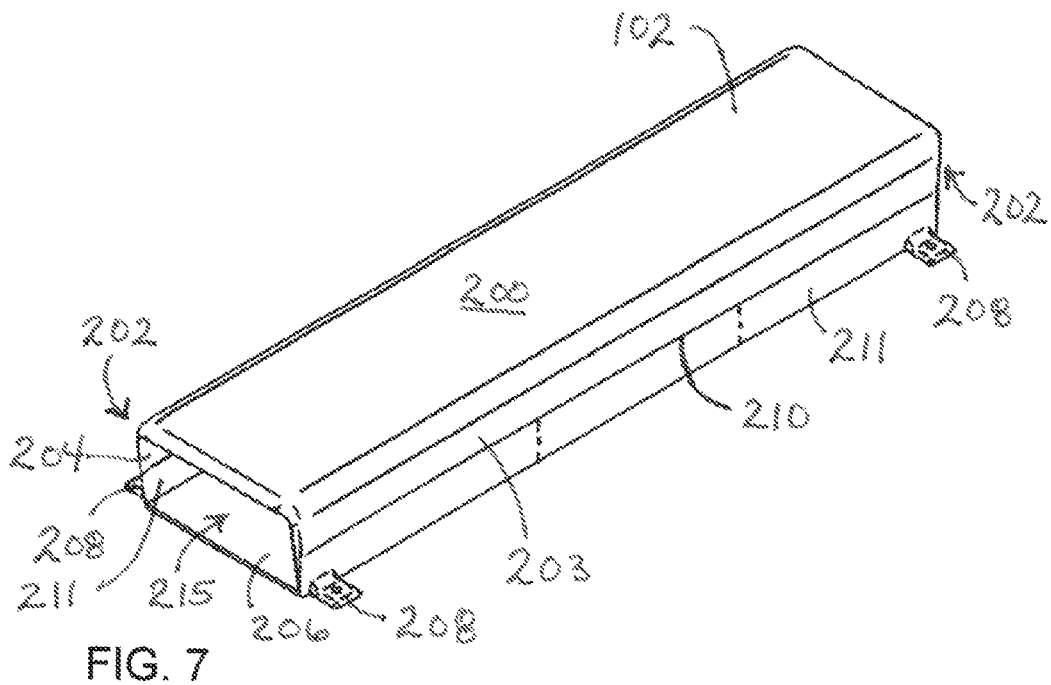
FIG. 7 is a perspective view of an exemplary elongated housing section according to the present disclosure.

This application claims priority to U.S. patent application No. 61/852,414, filed 15 Mar. 2013, submitted by the same inventors, which is hereby incorporated by reference in order to ensure the balance of the inventors' rights to the subject matter disclosed therein are preserved.

Now, referring to FIGS. 1a and 1b, through 6, exemplary clip halves 10 are shown. The clip halves 10 are intended to be deployed in decorative curbing with the top 16 oriented upward and the bottom 18 oriented downward. In that orientation, when installed conduit void 28 is positioned adjacent to the ground. A pair of clip halves 10 are joinable to create a grout clip 30. The clip halves 10 may be joinable by fasteners, for example a nut and bolt set, through a combination of corresponding fastener holes 14 in each clip half 10. Clip halves 10 may be designed to interlock, with the interior faces 24 of each half facing each other, and the exterior faces 26 facing away.

The exemplary clip half 10 has an abutment face 20 on the exterior face 26. Additionally, the exterior face 26 has a retaining lip 12 slightly removed from the exterior face 26, and a receiving groove 22 intermediate the retaining lip 12 and the exterior face 26. In the exemplary embodiment, the retaining lip 12 and receive groove 22 form an angle a up from horizontal, when placed in the typical installation position.

Referring now to FIG. 7, the structure of elongated housing section 102 is illustrated generally as having top surface 200 supported by front side 203 and rear side 204. In an embodiment, bottom plate 206 is secured between the bottom edges of front side 203 and rear side 204, to add strength to section 102. In the exemplary embodiment, angled end 202 angles slightly inward from the bottom plate 206 to top surface 200. The exemplary angled end 202 compliments angle a of the receiving groove 22 and retaining lip 12 of exemplary clip half 10. In an embodiment, tabs 208 are provided at the bottom edges of front side 203 and rear side 204 to provide an aperture through which a stake can be driven into the ground to secure section 102 in place. These tabs can be covered with landscaping material once section 102 is secured. As shown in FIG. 7, top surface 200 may have a rounded edge where top surface joins front side 203 and another rounded edge where top surface joins rear side 204. In an alternative embodiment, front side 203 and rear side 204 include breakaway interface 210 that runs the length of the piece, such as a groove cut into the front and/or rear surface of front side 203 and/or rear side 204, thus dividing the piece into a breakaway lower portion 211 on front side and/or rear side 204. In place of scoring, breakaway interface 210 is configured on front side 203 and/or rear side 204 with perforations, allowing a user to snap off interface 210, or portions of interface 210. Such embodiments are useful during installation of sections 102, 104, 106 (sections 104 and 106 depicted in FIG. 9), in instances where there is uneven ground, or obstacles in the installation path of sections 102, 104, 106.

Figure 8:
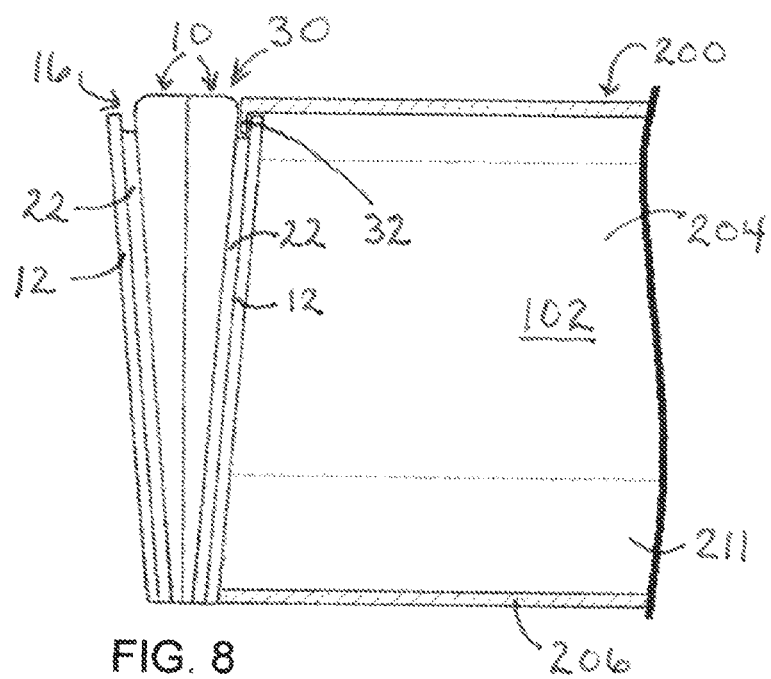
FIG. 8 is an orthogonal side view of a joined pair of exemplary clip halves attached to a cut-away housing section according to the present disclosure.

Referring now to FIG. 8, an exemplary interface for secure attachment of an exemplary grout clip 30 to an exemplary housing section 102 is shown. In the exemplary embodiment, the section 102 has an engagement lip 32. The sides of exemplary engagement lip 32 slides into the exemplary retaining groove 22 as the housing section 102 is engaged from the clip top 16 by the grout clip 30. Grout clip 30 may slid down the clip half 10 retaining groove 22 to the position shown in FIG. 8, where the top of engagement lip 32 seats into the top of the corresponding retaining groove 22. In this position, the exterior face of the engagement lip 32 faces, and may contact the exemplary abutment face 20 of the clip half 10, providing stability to the connection. Though the connection is stable enough to keep the grout clip 30 connected to the adjoining sections 102, the connection still provides for flexibility and limited movement between the grout clip 30 and the section 102. Such yielding movement prevents damage to the components and promotes longevity.

Figure 9:
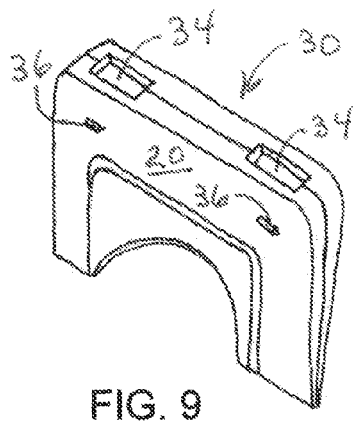
FIG. 9 is a perspective view schematic illustration of an alternate exemplary clip halves according to the present disclosure.

Referring now to FIG. 9 an alternate exemplary grout clip 30 is shown having accessory receivers 34. An exemplary accessory receiver 34 may house a variety of accessories desirable in a landscaping scenario, for example, without creating limitations, a solar cell or collector and an LED illumination feature. Additionally, alternate exemplary grout clip 30 is shown to have detent latches 36 that retractably extend from the exemplary abutment face 20.

Figure 10:
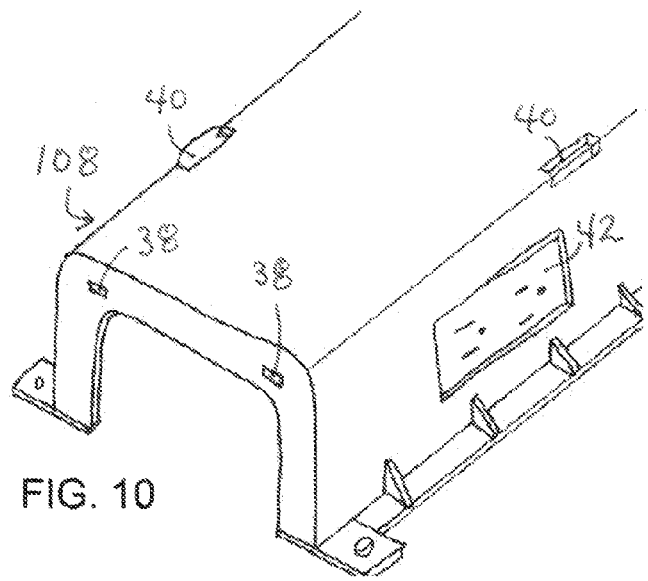
FIG. 10 is a perspective view schematic illustration of an alternate exemplary housing section according to the present disclosure.

Referring also to FIG. 10, an alternate exemplary embodiment housing section 108 is shown having accessory receivers 40 and an outlet receiver 42. An exemplary accessory receiver 40 may house a variety of accessories desirable in a landscaping scenario, for example, without creating limitations, a solar cell or collector and an LED illumination feature. An exemplary outlet receive 42, shown as a grounded AC power outlet, may additionally support other connections, for example, without creating limitations, ethernet, USB, water, television, telephone, and Wi-Fi.

Additionally, alternate exemplary section 108 is shown to have detent recesses 38, correspondingly designed to receive the detents of a suitable grout clip 30 detent latch 36. Detent latches 36 may be retracted by slight pressure during engagement with a housing section 108, but then extends into respective detent recesses 38 when properly engaged. The interplay between a detent latch 36 and a respective detent recess 38 prohibits the grout clip 30 from becoming disconnected from section 108 too easily. Given the disclosure of the combination of a detent latch 36 and a detent recess 38, one of ordinary skilled in the art will be able to identify other suitable relative securement means.

Figure 11:
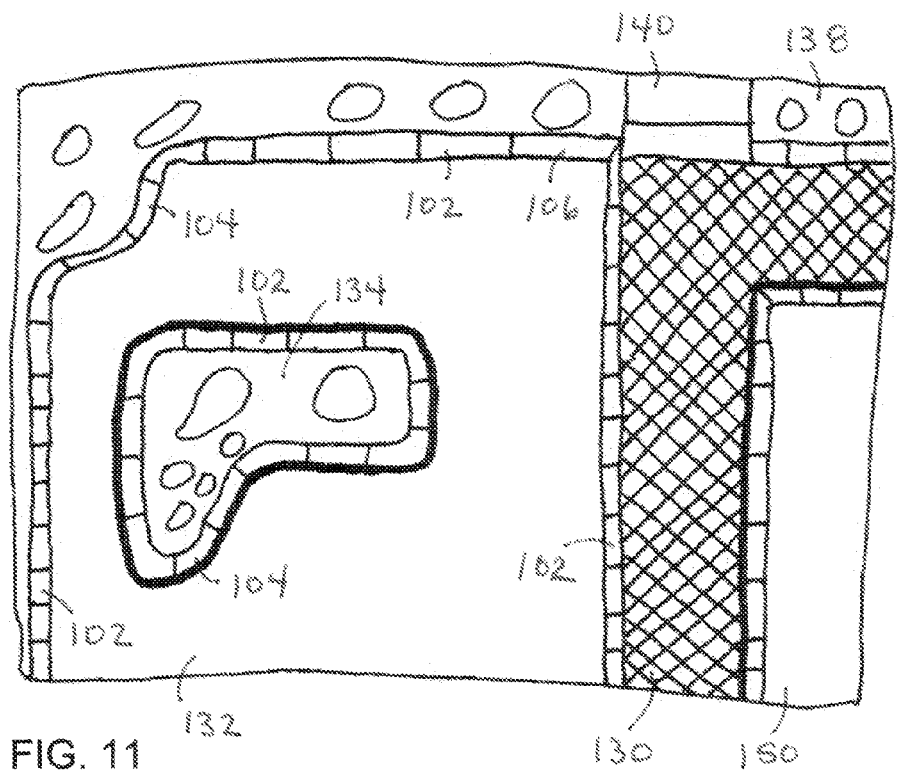
FIG. 11 illustrates a plan view of exemplary decorative curbing deployed in a landscaping application according to the present disclosure.

Referring now to FIG. 11, exemplary decorative curbing is shown deployed in a landscaping application. Decorative curbing may consist of various embodiments of housing sections. Example housing sections include straight, elongated pieces 102, as well as curved pieces 104, and angular pieces 106. Decorative curbing, as illustrated, is employed in a landscaping setting where plants, rocks, soil, water, and other material typically found in landscaping applications are organized in a desired format. Elongated pieces 102 can be presented at different lengths within an application, as curved pieces 104 can be presented at different radii, and angular pieces 106 can be presented as having different angles.

As shown, walkway 130 may be bordered by elongated pieces 102 and angular pieces 106. Grass may fill in area 132, and smaller areas such as garden area 134 may be presented within area 132 using elongated pieces 102 and curved pieces 104. Additionally, areas 136, 138, as well as stepped entrance 140 may also be defined using pieces 102, 104 and 106, as shown.

It is contemplated by the inventors that walkway 130 can be tiled with solar panels and placed in connection to provide power and/or communication with devices deployed within pieces 102, 104, 106. It is also contemplated by the inventors that area 150 can be a rooftop of a structure that includes solar panels deployed in roofing tiles of equivalent dimension to conventional roofing tiles and connected to provide power and/or communication to pieces 102, 104, 106.

The present device may be described as a landscaping curb system that could have a housing section and a grout clip, said housing section constructed from durable, weather-resistant material, and shaped to present the outward appearance of a landscaping curb, and said grout clip yieldably securable to at least one housing section, to form an assembled configuration. Another embodiment may also have the previously described landscaping curb system, further comprising the housing section and the grout clip each forming a void, the housing section void and the grout clip void in communication while in the assembled configuration to form a conduit channel. Another embodiment may also have the previously described landscaping curb system, further comprising the housing section having a substantially hollow body, wherein the housing section comprises a top surface, the top surface supported by two sides, and the two sides disposed in a parallel relationship with respect to each other. Another embodiment may also have the previously described landscaping curb system, further comprising the two sides of relative height so as to support the top surface in a plane with a parallel relationship to the ground, in the assembled configuration. Another embodiment may also have the previously described landscaping curb system, further comprising one of the two sides shorter in relative height so as to support the top surface in a plane with an angled relationship to the ground, in the assembled configuration. Another embodiment may also have the previously described landscaping curb system, further comprising the housing section having an elongated and straight shape. Another embodiment may also have the previously described landscaping curb system, further comprising the housing section having a curved shape. Another embodiment may also have the previously described landscaping curb system, further comprising the housing section having divided into a first section and a second section, the first and second sections connected in an angular relationship. Another embodiment may also have the previously described landscaping curb system, further comprising at least one of said housing sections or said grout section having either or both an accessory receiver and an outlet receiver. Another embodiment may also have the previously described landscaping curb system, further comprising means for maintaining a relatively secure connection between a grout clip and a housing, while permitting effective yield effective to reduce wear or breakage risk from repeated incidence of weight or excessive weight being applied to the housing or grout clip.

The present device may additively or alternatively be described as a landscaping curb system comprising a housing section and a grout clip, said housing section constructed from durable, weather-resistant material, and shaped to present the outward appearance of a landscaping curb and said grout clip slideably securable to at least one housing section, to form an assembled configuration. Another embodiment may also have the previously described landscaping curb system, further comprising means for maintaining a relatively secure connection between a grout clip and a housing, while permitting effective yield effective to reduce wear or breakage risk from repeated incidence of weight or excessive weight being applied to the housing or grout clip. Another embodiment may also have the previously described landscaping curb system, further comprising the housing section and the grout clip each forming a void the housing section void and the grout clip void in communication while in the assembled configuration to form a conduit channel. Another embodiment may also have the previously described landscaping curb system, further comprising the housing section having a substantially hollow body, wherein the housing section comprises a top surface, the top surface supported by two sides, and the two sides disposed in a parallel relationship with respect to each other. Another embodiment may also have the previously described landscaping curb system, further comprising the two sides of relative height so as to support the top surface in a plane with a parallel relationship to the ground, in the assembled configuration. Another embodiment may also have the previously described landscaping curb system, further comprising one of the two sides shorter in relative height so as to support the top surface in a plane with an angled relationship to the ground, in the assembled configuration. Another embodiment may also have the previously described landscaping curb system, further comprising the grout clip retaining lip and a receiving groove. Another embodiment may also have the previously described landscaping curb system, further comprising the housing section having an engagement lip. Another embodiment may also have the previously described landscaping curb system, further comprising the receiving groove and the engagement lip having a complimentary angular relationship so as to be slideably securable in the assembled configuration. Another embodiment may also have the previously described landscaping curb system, further comprising the grout clip having clip half securable to a specialized housing component.

These examples illustrate only a few configurations that are considered by the inventor within the scope of this disclosure. The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

We claim:
1. A landscaping curb system for assembly on an installation surface comprising:
  a housing section and a grout clip;
  said housing section constructed from durable, weather-resistant material, and shaped to present the outward appearance of a landscaping curb;
  said grout clip having an abutment face that with the grout clip positioned on the installation surface forms an inclined angle from perpendicular to the installation surface;
  said housing section having an angled end complimentary to the abutment face;
  said grout clip abutment face slideably securable to the angled end of at least one housing section, to form an assembled configuration;
  the housing section and the grout clip each forming a void;
  the housing section void and the grout clip void in communication while in the assembled configuration to form a conduit channel; and
  the housing section having a substantially hollow body, wherein the housing section comprises a top surface, the top surface supported by two sides, and the two sides disposed in a parallel relationship with respect to each other.

2. The landscaping curb system of claim 1, further comprising:
  the two sides of relative height so as to support the top surface in a plane with a parallel relationship to the ground, in the assembled configuration.

3. The landscaping curb system of claim 1, further comprising:
  one of the two sides shorter in relative height so as to support the top surface in a plane with an angled relationship to the ground, in the assembled configuration.

4. The landscaping curb system of claim 1, further comprising:
  the housing section having an elongated and straight shape.

5. The landscaping curb system of claim 1, further comprising:
  the housing section having a curved shape.

6. The landscaping curb system of claim 1, further comprising:
  at least one of said housing sections or said grout section having either or both an accessory receiver and an outlet receiver.

7. The landscaping curb system of claim 1, further comprising:
    the grout clip having a retaining lip and a receiving groove on the abutment face.

8. The landscaping curb system of claim 7, further comprising:
    the housing section having an engagement lip.

9. The landscaping curb system of claim 7, further comprising:
    the receiving groove and the engagement lip having a complimentary angular relationship in the assembled configuration, and form a slideably securable connection between said grout clip and said at least one housing section.

10. The landscaping curb system of claim 1, further comprising:
    the grout clip securable to a specialized housing component at the abutment face.

11. The landscaping curb system of claim 1 wherein the inclined angle being less than 45 degrees from perpendicular.

12. The landscaping curb system of claim 1 wherein the inclined angle being less than 30 degrees from perpendicular.

13. The landscaping curb system of claim 1, further comprising:
    the combination of the abutment face and the angled end having a relative securement means.

14. A landscaping curb system comprising:
    a housing section and a grout clip;
    said housing section constructed from durable, weather-resistant material, and shaped to present the outward appearance of a landscaping curb;
    said housing section having an angled end with an engagement lip;
    said grout clip having a retaining lip and a receiving groove on an angled abutment face;
    said retaining lip and said receive groove sized to interlock with said engagement lip in an assembled configuration;
    said abutment face and said angled end having a complimentary angular relationship in said assembled configuration;
    the housing section and the grout clip each forming a void;
    the housing section void and the grout clip void in communication while in the assembled configuration to form a conduit channel; and
    the housing section having a substantially hollow body, wherein the housing section comprises a top surface, the top surface supported by two sides, and the two sides disposed in a parallel relationship with respect to each other.

15. The landscaping curb system of claim 14, further comprising:
    the two sides of relative height so as to support the top surface in a plane with a parallel relationship to the ground, in the assembled configuration.

16. The landscaping curb system of claim 14, further comprising:
    one of the two sides shorter in relative height so as to support the top surface in a plane with an angled relationship to the ground, in the assembled configuration.

* * * * *